United States Patent [19]
Coffey et al.

[11] Patent Number: 5,809,849
[45] Date of Patent: Sep. 22, 1998

[54] MACHINE FOR STRIPPING INSULATION FROM WIRE

[76] Inventors: Kevin M. Coffey, 4532 Countryside West, Friendsville, Tenn. 37737; Paris G. Coffey, 550 Longhollow Rd., Maryville, Tenn. 37801

[21] Appl. No.: 598,251

[22] Filed: Feb. 8, 1996

[51] Int. Cl.⁶ ................................................. H02G 1/12
[52] U.S. Cl. .......................................... 81/9.51; 30/90.8
[58] Field of Search ................ 81/9.4, 9.51; 30/90.1, 30/90.4, 90.8, 90.9

[56] References Cited

U.S. PATENT DOCUMENTS

| | | | |
|---|---|---|---|
| 3,309,947 | 3/1967 | Denney | 81/9.51 |
| 3,368,428 | 2/1968 | Gudmestad | 81/9.51 |
| 3,462,052 | 8/1969 | Wagner | 81/9.51 X |
| 3,631,748 | 1/1972 | Kuts | 81/9.51 X |
| 4,811,633 | 3/1989 | Bueschel et al. | 81/9.51 |
| 4,827,676 | 5/1989 | Kindermann | 51/281 R |
| 4,961,357 | 10/1990 | Butler et al. | 81/9.51 |
| 5,074,169 | 12/1991 | Matz | 81/9.51 |
| 5,107,735 | 4/1992 | Ramun et al. | 83/407 |
| 5,109,598 | 5/1992 | Koch | 29/825 |
| 5,140,873 | 8/1992 | Schwartzman | 81/9.43 |
| 5,243,882 | 9/1993 | Stepan | 81/9.51 |
| 5,293,683 | 3/1994 | Hoffa | 29/825 |
| 5,343,605 | 9/1994 | Nazerian et al. | 29/33 M |
| 5,402,693 | 4/1995 | Hoffa | 81/9.51 |
| 5,412,856 | 5/1995 | Nazerian et al. | 29/33 M |
| 5,445,051 | 8/1995 | Carpenter et al. | 81/9.51 |
| 5,479,701 | 1/1996 | Yamano et al. | 81/9.51 X |

FOREIGN PATENT DOCUMENTS 0103017  4/1991  Japan ...................................... 81/9.51

*Primary Examiner*—D. S. Meislin
*Attorney, Agent, or Firm*—Pitts & Brittian, P.C.

[57] ABSTRACT

A machine for stripping insulation from wire (10) for the salvaging of the encased conductors. The machine for stripping insulation from wire (10) includes a first pair of geared rollers (12) defining a first nip (20) for receiving and pushing wire toward a cutting head (16) and a second pair of geared rollers (14) similarly defining a second nip (28) for pulling the wire from the cutting head (16) and stripping the severed insulation from the wire, the cutting head (16) defining at least two rotatable cutting blades (46) disposed opposite and biased toward each other to adjust for differing dimensions of wire, the cutting head (16) being positioned between the first and second pair of geared rollers (12,14) to cut the insulation from the wire, a frame (18) for carrying the pairs of geared rollers (12,14) and cutting head (16) and a drive mechanism (64) for variably tensioning the geared rollers (12,14) such that the insulated wire is maintained under a constant tension during the cutting and stripping process.

15 Claims, 6 Drawing Sheets

MACHINE FOR STRIPPING INSULATION FROM WIRE

TECHNICAL FIELD

This invention relates to the field of wire stripping devices and, more particularly, to an apparatus that strips the insulation or casing from wire to facilitate the salvage of the encased conductor.

BACKGROUND ART

In the field of wire stripping devices, methods for selectively measuring, cutting and stripping insulation from an end of an encased conductor are well-known. However, such devices are not adaptable for the removal of insulation from wire, such as scrap wire, for salvage of the encased conductors.

Contracting companies which utilize encased conductors in construction are constantly faced with the dilemma of disposing of the scrap wire generated in completing a given project. Most companies attempt to salvage some of the value of the wire by burning the insulative casing from the conductor prior to tendering it to a recycle facility. Typically, however, burning the casing from the conductor decreases its salvage value as this process frequently results an incomplete removal of the casing and the deposit of an ash residue on the conductor. Moreover, such activities are outlawed by certain states as the burning process creates toxic fumes and is otherwise environmentally damaging. The burning process is also inefficient in that a great deal of labor is required to recover the burnt insulator.

Other devices have been produced to strip insulative casing from encased conductors. Typical of the art are those devices disclosed in the following U.S. patents:

| U.S. Pat. No. | Inventor(s) | Issue Date |
| --- | --- | --- |
| 4,811,633 | D. M. Bueschel, et al. | Mar 14, 1989 |
| 4,827,676 | R. Kindermann | May 09, 1989 |
| 4,961,357 | J. D. Butler, et al. | Oct 09, 1990 |
| 5,074,169 | L. S. Matz | Dec 24, 1991 |
| 5,107,735 | J. Ramun, et al. | Apr 28, 1992 |
| 5,109,598 | M. Koch | May 05, 1992 |
| 5,140,873 | S. Schwartzman | Aug 25, 1992 |
| 5,243,882 | J. Stepan | Sep 14, 1993 |
| 5,293,683 | J. L. Hoffa | Mar 15, 1994 |
| 5,343,605 | G. Nazerian, et al. | Sep 06, 1994 |
| 5,402,693 | J. L. Hoffa | Apr 04, 1995 |
| 5,412,856 | G. Nazerian, et al. | May 09, 1995 |
| 5,445,051 | T. S. Carpenter, et al. | Aug 29, 1995 |

The predominance of these patents disclose devices which feed and/or cut and strip the ends of conductors. The '735 patent issued to J. Ramun, et al., discloses a device which utilizes a two-step process for vertically stripping wire. The device is comprised of compound mechanisms having complex parts which function in a two-step process. In operation, the first step requires an in-feed cutting assembly to cut and remove a strip of insulation from cable as it passes through pair of cutting blades disposed on one side of the cable. The second step requires an exit wheel cutting assembly to make a single incision by an oppositely disposed single cutting blade thereby removing the remaining casing. A single piston and cylinder assembly is also disposed in the base beneath each cutting assembly to adjust for variable cable dimensions. The cutting assemblies of this device fail to optimize the movement and cutting of wire entering the machine as they utilize only one roller having a gripping surface. Further, the structure of these assemblies fails to preclude malfunction due to slippage of the wire on the rollers during the cutting process. Consequently, the assemblies also fail to insure the effectiveness of the overall function of the device as there is no means of insuring that cuts made into the insulation are of sufficient depth and uniformity to insure the stripping of the insulation. The device of the '735 patent also requires that a cable guide bar assembly be disposed between the cutting assemblies to provide a path for the progress of the cable through the machine. Further, this structure of the device requires a base, a frame and a motor fixed to that base which render it cumbersome, if not impractical, to transport.

Therefore, it is an object of this invention to provide a portable device for cutting and stripping insulation from scrap wire.

It is another object of this invention to provide a device for cutting and stripping insulation which is adaptable to other equipment already owned and used by contractors, such as pipe threading machines.

It is a further object of this invention to provide a device for cutting and stripping insulation from scrap wire, the device cutting the wire with a controlled tension to insure the sufficiency of the cuts made in the insulation and the efficacy of the stripping of the insulation from the insulated wire.

Additionally, it is an object of this invention to provide a device for cutting and stripping insulation from scrap wire which is simple in construction.

It is also an object of this invention to provide a device for cutting and stripping insulation from scrap wire which is easy to use.

Moreover, it is an object of this invention to provide a means for cutting and stripping insulation from scrap wire which is economical in construction, cost and repair.

It is another object of this invention to provide a device for cutting and stripping insulation from scrap wire without resulting ash or residue.

It is also an object of this invention to provide a device for cutting and stripping insulation from scrap wire which will preserve the integrity of the conductor and its recovery value.

An additional object of this invention to provide a device for cutting and stripping insulation from scrap wire which is more time efficient and effective than currently utilized methods.

Further, it is an object of this invention to provide a device for cutting and stripping insulation from scrap wire having a simplified mechanism to adjustably receive scrap wire of varying dimensions.

An equally important object of this invention is to provide a device for cutting and stripping insulation from scrap wire which will assist in preserving the environment and complying with related regulations.

DISCLOSURE OF THE INVENTION

Other objects and advantages will be accomplished by the present invention which serves to cut and strip insulation from insulated wire. The machine for stripping insulation from wire of the present invention includes a first pair of geared rollers and a second pair of geared rollers, a cutting head positioned between the first and second pair of geared rollers, a frame for carrying the pairs of geared rollers and cutting head, and a drive mechanism coordinating the interconnection of the geared rollers such that the insulated wire is cut and stripped of its insulation while it is maintained under a constant tension.

The first pair of geared rollers defines a nip for receiving and pushing insulated wire toward the cutting head. The teeth of the gearing on the first pair of geared rollers firmly grip the wire being inserted into the nip and push it toward the cutting head.

The second pair of geared rollers similarly defines a nip for pulling the insulated wire from the cutting head and stripping the cut insulation from the insulated wire. The teeth of the gearing on the second pair of geared rollers firmly grip and pull the insulated wire from the cutting head. The teeth of the second pair of geared rollers also function to remove the cut insulation casing from the insulated wire in the gripping and pulling process.

The cutting head cuts the insulation from the insulated wire. The cutting head defines at least two rotatable cutting blades disposed opposite and biased toward each other to adjust for differing dimensions of insulated wire.

The pair of geared rollers and the cutting head are carried within a frame.

The drive mechanism for coordinately interconnecting the geared rollers and transporting the insulated wire through the geared rollers and the cutting head such that the insulated wire is maintained under a constant tension during the cutting and stripping process.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
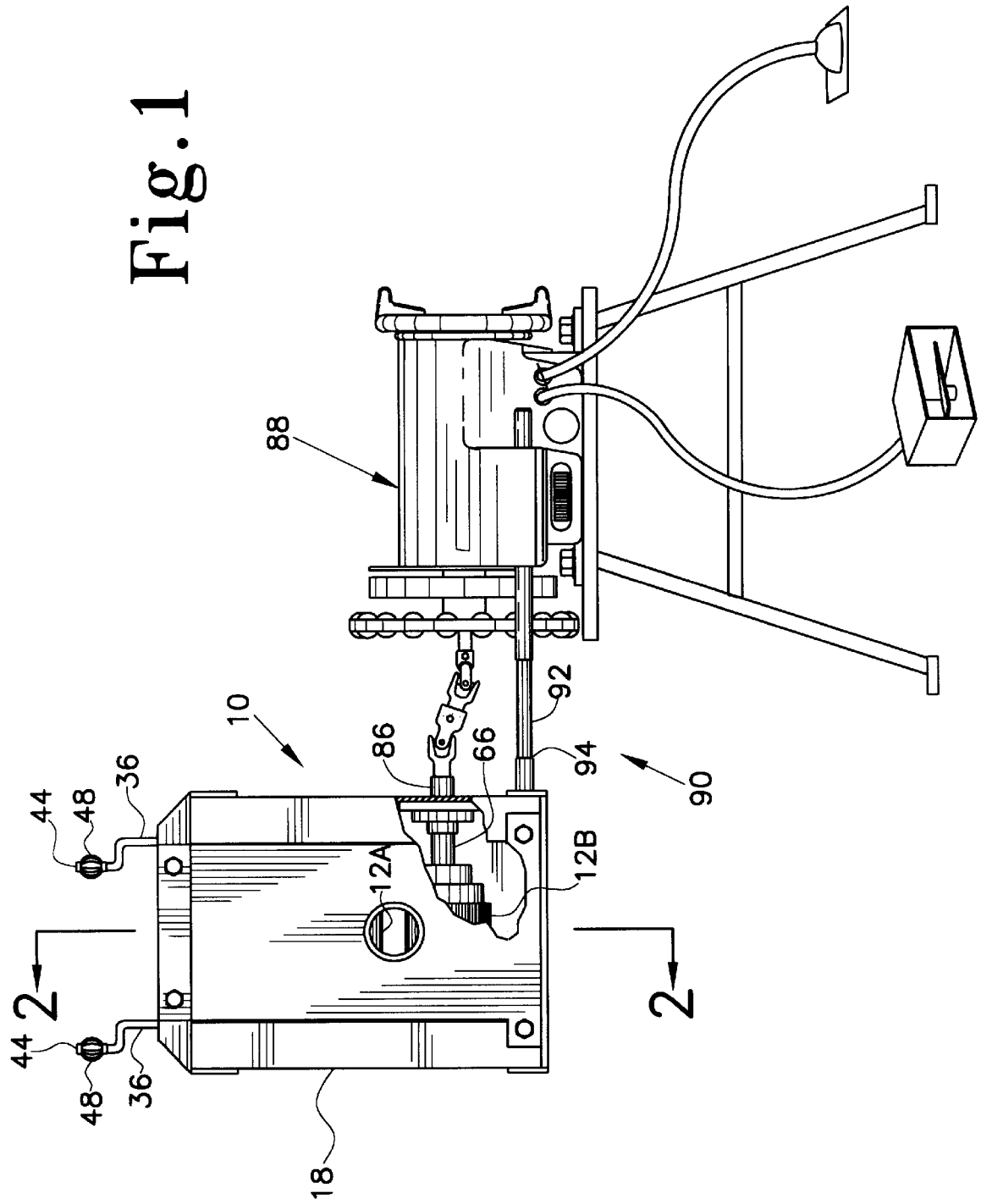
FIG. 1 is an end elevation view of the machine for stripping insulation from wire constructed in accordance with several features of the present invention.
Figure 2:
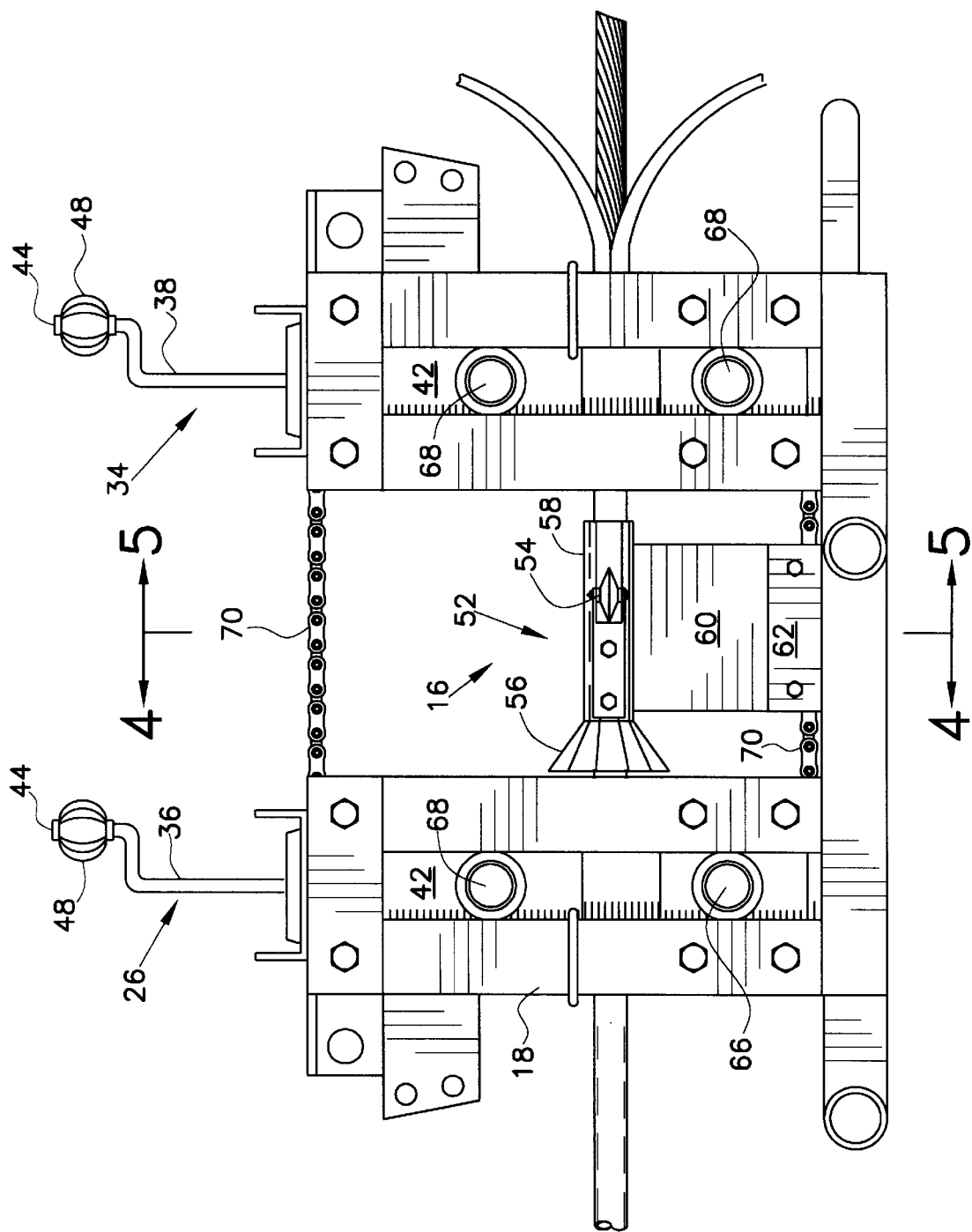
FIG. 2 illustrates a front elevation view, in section, of the machine for stripping insulation from wire taken at 2—2 of FIG. 1.
Figure 3:
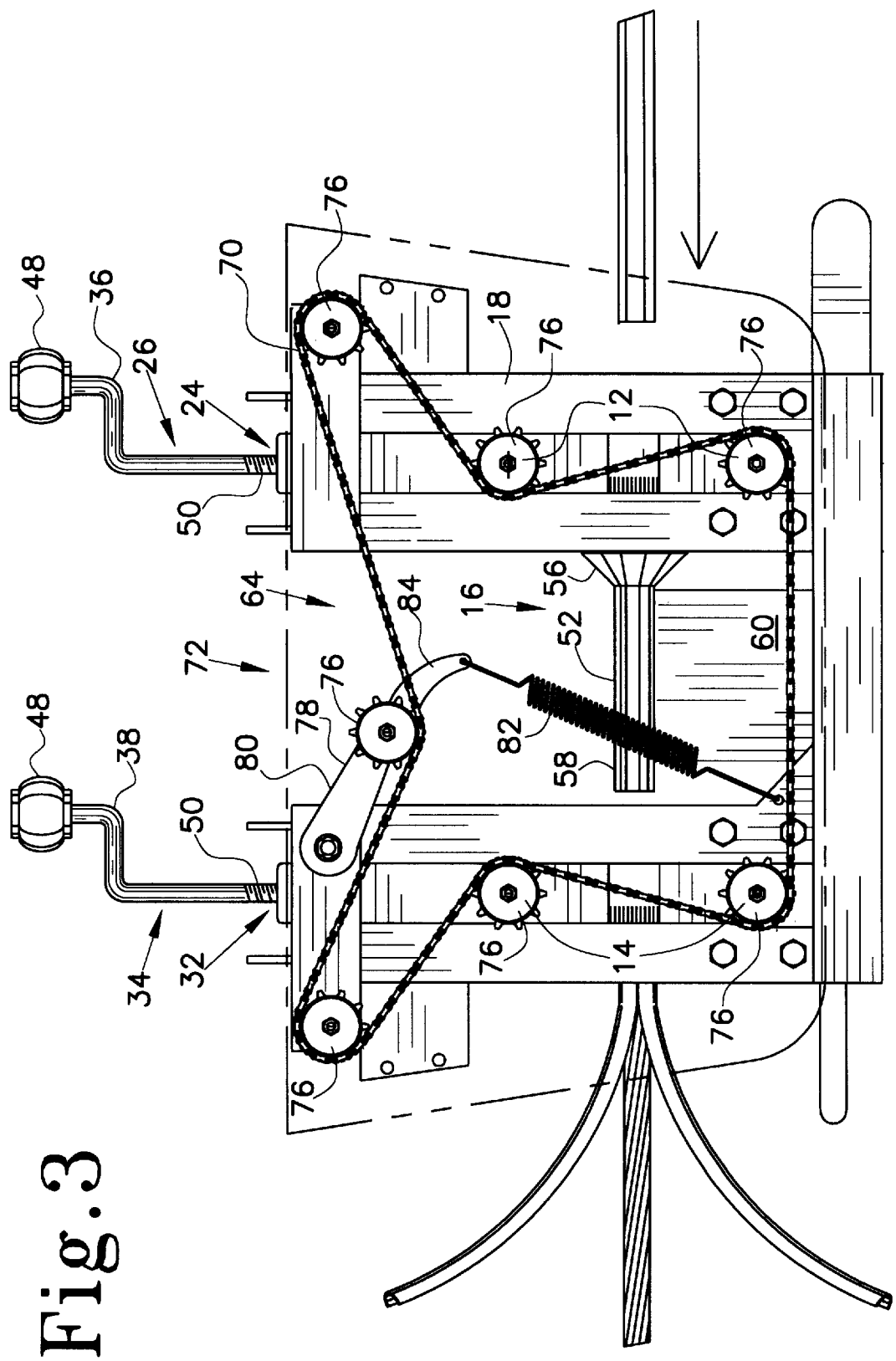
FIG. 3 is a rear elevational view of the machine of the present invention, with the cover removed.
Figure 4:
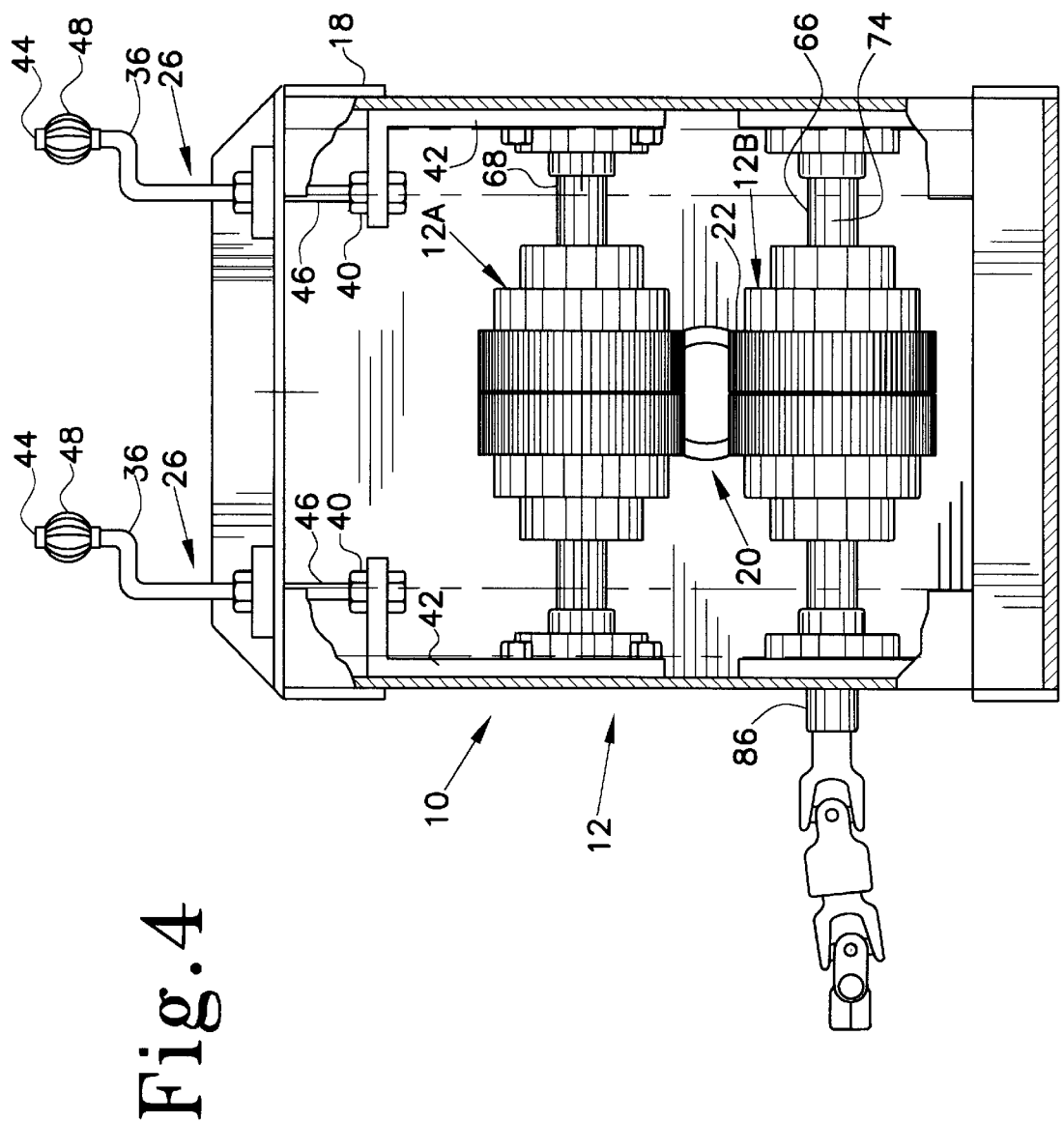
FIG. 4 illustrates an end elevation view of the machine for stripping insulation from wire of the present invention taken along 4—4 of FIG. 2.
Figure 5:
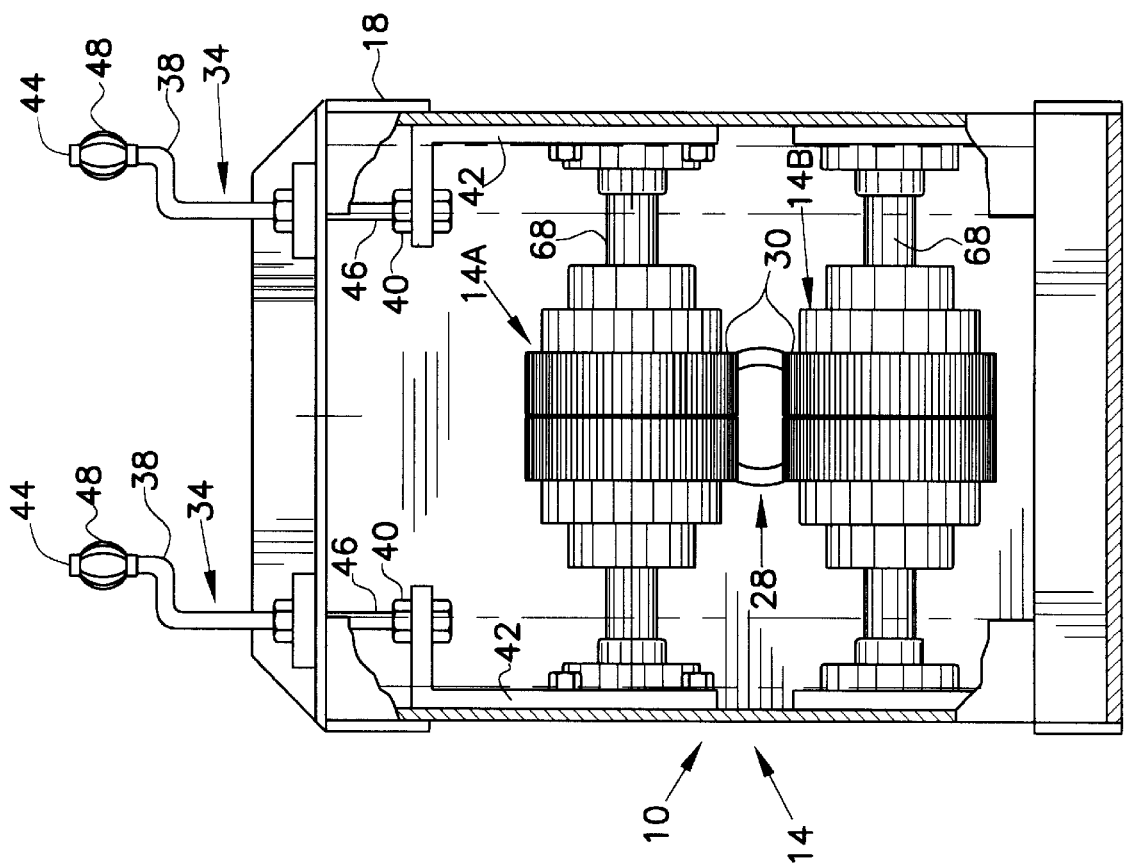
FIG. 5 illustrates an end elevation view of the machine for stripping insulation from wire of the present invention taken along 5—5 of FIG. 2.
Figure 6:
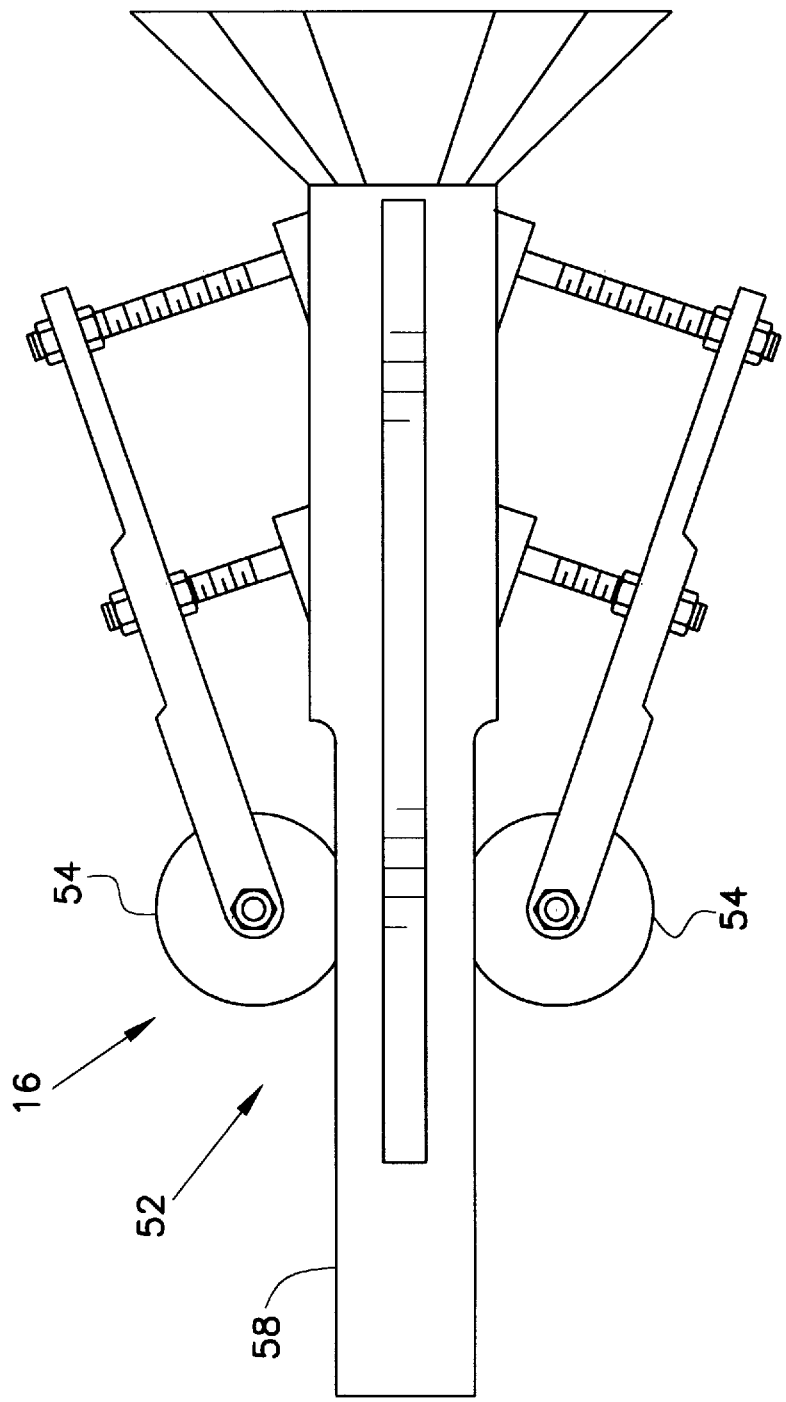
FIG. 6 is a plan view of the cutting head of the present invention.

A machine for stripping insulation from wire incorporating various features of the present invention is illustrated generally at 10 in the figures. The machine for stripping insulation from wire 10 is designed for stripping insulation from insulated wire for salvage of the encased conductor. Moreover, in the preferred embodiment the machine for stripping insulation from wire 10 is designed to adaptably adjust to stripping insulation from wire such that the encased conductors may be salvaged regardless of the composition or gauge of the conductor or its casing.

The machine for stripping insulation from wire 10 includes a first pair of geared rollers 12 and a second pair of geared rollers 14 received within a frame 18, a cutting head 16 positioned between the first pair of geared rollers 12 and the second pair of geared rollers 14, and a drive mechanism 64 for coordinately interconnecting the geared rollers 12,14 and transporting the insulated wire through the geared rollers 12,14 and the cutting head 16 such that the insulated wire is maintained under a constant tension during the cutting and stripping process.

The first pair of geared rollers 12 includes an upper roller 12A which is movable in a vertical direction and a lower roller 12B which is fixed other than for rotation about its axis. The point of contact between the upper roller 12A and the lower roller 12B defines a first nip 20 for receiving and pushing insulated wire toward the cutting head 16. Each of the first pair of geared rollers 12 defines a plurality of teeth 22 for firmly gripping the insulated wire inserted into the nip 20 and pushing it toward the cutting head 16. In the preferred embodiment, the first pair of geared rollers 12 further includes an adjustment mechanism 26 for vertically moving the upper roller 12A in order to strip insulated wire of differing dimensions, regardless of the gauge of the insulated wire or the encased conductor.

The second pair of geared rollers 14 similarly includes an upper roller 14A which is movable in a vertical direction and a lower roller 14B which is fixed other than for rotation about its axis. The point of contact between the upper roller 14A and the lower roller 14B defines a second nip 28 for pulling insulated wire from the cutting head 16 and stripping the severed insulation from the insulated wire. Each of the second pair of geared rollers 14 defines a plurality of teeth 30 for firmly gripping and pulling the insulated wire from the cutting head 16. The traction with which the teeth 30 grip the wire also enable it remove the cut insulation casing from the insulated wire in the gripping and pulling process. Like the first pair of geared rollers 12, in the preferred embodiment, the second pair of geared rollers 14 further includes an adjustment mechanism 34 for vertically moving the upper roller 14A.

The adjustment mechanisms 26,34 for the first and second pairs of geared rollers 12,14 of the preferred embodiment are identically fabricated. However, those skilled in the art will recognize that it is feasible to utilize differing adjustment mechanisms for each pair of geared rollers and still enable the machine of the present invention to function with equal effectiveness.

The adjustment mechanisms 26,34 include a first and a second pair of rotatable rods 36,38, respectively, bearings 40, and slidable plates 42 mounted on a lower end 46 of each of the first and second pair of rotatable rods 36,38. The first and second pair of rotatable rods 36,38 have an upper end 44 and are disposed in a perpendicular relation to the first and second pair of geared rollers 12,14, respectively, to provide for the vertical adjustment of the upper rollers 12A,14A. The rotatable rods 36,38 in the adjustment mechanisms 26,34 of the preferred embodiment further include an adjustment handle 48 which is received on and freely rotates about the upper end 44 of each rod 36,38. The bearings 40 are mounted to the lower ends 46 of the rotatable rods 36,38 to assist in the vertical movement of the rotatable rods 36,38 during adjustment. The bearings 40 permit rotation of the rods 36,38 with respect to the plates and may be toleranced to allow variation in adjustment between each of the pair of rods 36,38. The bearings 40 also function to interconnect slidable plates 42 with each of the respective rotatable rods 36,38. The slidable plates 42 are slidably disposed within the frame 18 and are carried by the upper rollers 12A,14A of the first and second pair of geared rollers 12,14 at either end thereof. As the adjustment mechanisms 26,34 are manipulated, the slidable plates 42 are vertically adjusted, thus vertically adjusting the upper rollers 12A,14A. Each of the rotatable rods 36,38 of the preferred embodiment defines a threaded portion for engaging threaded openings 24,32 defined by the frame 18 for facilitating the vertical movement of the upper rollers 12A,14A, respectively. Those skilled in the art will recognize that other friction-reducing methods, including the use of bushings, may substitute the bearings 40 of the present invention 10 and function with equal effectiveness.

Provision of manual adjustment mechanisms 26,34 insures that insulated wire having a soft rubber insulation will not bunch up or bind at the first nip 20 as the necessary adjustments are readily and easily made by the operator. While the adjustment mechanisms 26,34 of the preferred embodiment are manually operative, it is foreseeable that an automatic adjustment mechanism may be incorporated into the machine 10 with similarly effective results. A simple automatic adjustment mechanism is one in which the pairs of geared rollers 12,14 are biased toward each other on the rotatable rods 36,38 and adjust without manual assistance. In such a mechanism, the rotatable rods 36,38 do not require threading or the use of adjustment handles 44. A hybrid adjustment mechanism having both threaded slide rods 36,38 and adjustment handles 44, as well as a biasing means, is equally foreseeable.

The cutting head 16 cuts the insulation surrounding the insulated wire. The cutting head 16 includes a wire guide 52 and at least two rotatable cutting blades 54. The wire guide 52 defines a funnel-shaped end 56 for receiving the insulated wire from the first pair of geared rollers 12 and a tubular end 58. The tubular end 58 receives the at least two rotatable cutting blades 54 and directs the insulated wire through the cutting blades 54 to the second pair of geared rollers 14. The at least two rotatable cutting blades 54 are disposed opposite, and biased toward, each other to insure the sufficiency of the depth of the incision being made in the insulation. Biasing the at least two rotatable cutting blades 54 toward each other further enables the cutting head to automatically adjust for differing dimensions of insulated wire. The cutting head 16 of the preferred embodiment includes two rotatable cutting blades 54. The cutting head 16 of the preferred embodiment further includes a mounting plate 60 for interchangeably mounting of the cutting head 16 in a cutting head bracket 62 disposed in the housing 18 between the first and second pairs of geared rollers 12,14. In the preferred embodiment, the machine for stripping insulation from wire 10 further includes a plurality of cutting heads (not shown) which may be interchangeably secured into the cutting head bracket 62 and provide for the optional use of a variety of cutting guides 52 and cutting blades 54. Provision for the interchange of a plurality of cutting heads enables the machine of the present invention 10 to adapt to effectively cut and strip an even broader range of insulated gauge wire.

The machine for stripping insulation from insulated wire 10 of the preferred embodiment further comprises a drive mechanism 64 for automating the function of the machine 10. The drive mechanism 64 also assists in variably maintaining tension among the geared rollers 12,14 when cutting the insulated wire. The drive mechanism 64 includes a drive shaft 66 received within and extending from a geared roller of the first and second pairs of geared rollers 12,14, a plurality of rotating shafts 68, a drive chain 70 for coordinately interconnecting each of the geared rollers 12,14, and a tensioning device 72 for continuously adjusting the tension between the pairs of geared rollers 12,14. The drive shaft 66 defines a proximal end 74 for receiving a sprocket wheel 76. The sprocket wheel 76, in turn, engages the drive chain 70.

Each rotating shaft 68 similarly defines a proximal end 74 having a sprocket wheel 76 for engaging the drive chain 70. The drive chain 70 is disposed about each sprocket wheel 76 of the machine 10. The drive chain 70 and the sprocket wheels 76 uniformly and coordinately rotate the first and second pair of geared rollers 12,14. In the preferred embodiment, the drive mechanism 64 includes two additional sprocket wheels 76 rotatably mounted to the housing 18 to enhance its overall function. The tensioning device 72 provides tension to the drive chain 70 to a constant maintain the tension on the wire being stripped. The constant tension maintained by the tensioning device 72 helps to insure that the insulation of the insulated wire will be cut a sufficient depth and that the stripping process will be successful. The tensioning device 72 further functions to relieve the tension in the machine 10 entirely and idle the machine 10 in the event of a jam.

The tensioning device 72 of the preferred embodiment includes a lever arm 78 secured to the frame 18 on one end 80, a sprocket wheel 76 rotatably secured to the lever arm 78 and a bias means 82 which extends from another end 84 of the lever arm 78 to the frame 18 and creates tension in the drive chain 70.

In the preferred embodiment, the drive shaft 66 is disposed in a lower roller of the first or second pair of geared rollers 12,14. The drive shaft 66 of the preferred embodiment is disposed within the lower roller 12A of the first pair of geared rollers 12. The drive shaft 66 of the preferred embodiment further includes a distal end 86 for being slidably received within a power source 88 to furnish power to the machine 10. It is readily recognizable that a power source 88 may consist of a handle which is mountable on the distal end 58 of the drive shaft 66 for manually powering the machine 10. In the preferred embodiment, however, the power source 60 is electrically driven, such as with the drill chuck of a ridge pipe threading machine.

It will be recognized that the machine for stripping insulation from wire 10 can easily be constructed as a free-standing device disposed on a tripod and can be closely positioned to the ridge pipe threading machine for operation, for instance. Alternatively, a free-standing machine for stripping insulation from wire 10 may be fitted with a motor or gas engine for operation independent of the ridge pipe threading machine. In the preferred embodiment, however, the machine for stripping insulation from wire 10 further includes a mounting mechanism 90 for mounting said machine 10 on the ridge pipe threading machine. In the preferred embodiment, the mounting mechanism 90 includes mounting pipes 92 which are received in mounting pipe openings 94 on the machine 10 of the present invention and in similar openings on the ridge pipe threading machine, connectively joining both machines.

From the foregoing description, it will be recognized by those skilled in the art that a machine for stripping insulation from wire 10 offering advantages over the prior art has been provided. Specifically, the machine 10 of the present invention further provides a simplified mechanism which adjustably cuts and strips insulation from scrap wire of varying dimensions with a controlled tension to insure the sufficiency of the cuts made by the device and the efficacy of the performance of the device. The machine for stripping insulation from wire 10 provides a device for cutting and stripping insulation from scrap wire without resulting ash or residue thereby preserving the integrity of the conductor and its recovery value. The machine 10 of the present invention further provides a device for cutting and stripping insulation from scrap wire which is both portable and adaptable to other equipment already owned and used by contractors, such as ridge pipe threading machines. Such a device, thus, is more time efficient and effective and assists in preserving the environment by facilitating compliance with related regulations. Additionally, the machine for stripping insulation from wire 10 is simple in construction, easy to use and is economical in construction, cost and repair.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention,
We claim:

1. A machine for stripping insulation from a length of insulated wire, said machine comprising:
   a first pair of geared rollers carried within a frame and defining a first nip for receiving and pushing insulated wire toward a cutting head, said first pair of geared rollers including an upper roller and a lower roller, said upper roller being movable in a vertical direction and rotatable about its axis, said lower roller being fixed other than for rotation about its axis;
   a cutting head for cutting said insulation along a line parallel to said length of said wire, said cutting head including at least one cutting blade disposed parallel to a direction of travel of said insulated wire;
   a second pair of geared rollers carried within said frame and defining a second nip for pulling said insulated wire from said cutting head and stripping insulation from said wire, said cutting head being positioned between said first and said second pair of geared rollers;
   a first roller adjustment mechanism for adjusting said first nip, said first roller adjustment mechanism including a first pair of rotatable rods, bearings closely mounted to each of said rotatable rods, and slidable plates mounted on a lower end of said first pair of rotatable rods, said rotatable rods being disposed in perpendicular relation to said first pair of geared rollers, said bearings for providing fluid motion to said rotatable rods and maintaining proper alignment of said geared rollers, said slidable plates being slidably disposed within said housing for receiving said upper roller of said first pair of geared rollers to vertically adjust said upper roller upon rotation of said rotatable rods; and
   a drive mechanism for coordinately interconnecting said geared rollers and driving said insulated wire through said geared rollers and said cutting head such that said insulated wire is maintained under a constant tension during the cutting and stripping process.

2. The machine of claim 1 wherein said adjustment mechanism is manually adjusted.

3. The machine of claim 2 wherein said first pair of rotatable rods further include an upper end and an adjustment handle disposed on and freely rotating about said upper end for manually rotating said rotatable rods and adjusting said upper roller of said first pair of geared rollers.

4. The machine of claim 3 wherein said first pair of rotatable rods are disposed within said housing and further include a threaded portion for engaging a threaded opening defined by said frame for facilitating the vertical movement of said upper rollers.

5. The machine of claim 1 wherein said first roller adjustment mechanism includes a biasing member for biasing one geared roller of said first pair of geared rollers toward another geared roller of said first pair of geared rollers to accommodate for insulated wires of various dimensions.

6. The machine of claim 1 wherein said bearings are bushings.

7. A machine for stripping insulation from a length of insulated wire, said machine comprising:
   a first pair of geared rollers carried within a frame and defining a first nip for receiving and pushing insulated wire toward a cutting head;
   a cutting head for cutting said insulation along a line parallel to said length of said wire, said cutting head including at least one cutting blade disposed parallel to a direction of travel of said insulated wire;
   a second pair of geared rollers carried within said frame and defining a second nip for pulling said insulated wire from said cutting head and stripping insulation from said wire, said second pair of geared rollers including an upper roller and a lower roller, said upper roller being movable in a vertical direction and rotatable about its axis, said lower roller being fixed other than for rotation about its axis, said cutting head being positioned between said first and said second pair of geared rollers;
   a second roller adjustment mechanism for adjusting said second nip, said second roller adjustment mechanism including a second pair of rotatable rods, bearings closely mounted to each of said rotatable rods, and slidable plates mounted on a lower end of said second pair of rotatable rods, said rotatable rods being disposed in perpendicular relation to said second pair of geared rollers, said bearings for providing fluid motion to said rotatable rods and maintaining proper alignment of said geared rollers, said slidable plates being slidably disposed within said housing for receiving said upper roller of said second pair of geared rollers to vertically adjust said upper roller upon rotation of said rotatable rods; and
   a drive mechanism for coordinately interconnecting said geared rollers and driving said insulated wire through said geared rollers and said cutting head such that said insulated wire is maintained under a constant tension during the cutting and stripping process.

8. The machine of claim 7 wherein said adjustment mechanism is manually adjusted.

9. The machine of claim 8 wherein said second pair of rotatable rods further include an upper end and an adjustment handle disposed on and freely rotating about said upper end for manually rotating said rotatable rods and adjusting said upper roller of said second pair of geared rollers.

10. The machine of claim 9 wherein said second pair of rotatable rods are disposed within said frame and further include a threaded portion for engaging a threaded opening defined by said frame for facilitating the vertical movement of said upper rollers.

11. The machine of claim 7 wherein said second roller adjustment mechanism includes a biasing member for biasing one geared roller of said second pair of geared rollers toward another geared roller of said second pair of geared rollers to accommodate for insulated wires of various dimensions.

12. The machine of claim 7 wherein said bearings are bushings.

13. A machine for stripping insulation from a length of insulated wire, said machine comprising:
   a first pair of geared rollers carried within a frame and defining a first nip for receiving and pushing insulated wire toward a cutting head;

a cutting head for cutting said insulation along a line parallel to said length of said wire, said cutting head including a wire guide and at least one rotatable cutting blade disposed parallel to a direction of travel of said insulated wire, said wire guide defines a funnel-shaped end for receiving said insulated wire from said first pair of geared rollers and a tubular end opposite said funnel end for receiving said at least one rotatable cutting blade and directing said insulated wire through said cutting blade and to said second pair of geared rollers;

a second pair of geared rollers carried within said frame and defining a second nip for pulling said insulated wire from said cutting head and stripping insulation from said wire, said cutting head being positioned between said first and said second pair of geared rollers; and a drive mechanism for coordinately interconnecting said geared rollers and driving said insulated wire through said geared rollers and said cutting head such that said insulated wire is maintained under a constant tension during the cutting and stripping process.

14. The machine of claim 13 wherein said cutting head includes at least two rotatable cutting blades disposed opposite each other and biased toward each other to adjust for different gauges of insulated wire.

15. A machine for stripping insulation from a length of insulated wire, said machine comprising:

a first pair of geared rollers carried within a frame and defining a first nip for receiving and pushing insulated wire toward a cutting head, said first pair of geared rollers including an upper roller and a lower roller, said upper roller being movable in a vertical direction and rotatable about its axis, said lower roller being fixed other than for rotation about its axis, said frame including a cutting head bracket, said first nip being adjusted by a first roller adjustment mechanism, said first roller adjustment mechanism including a biasing member for biasing one geared roller of said first pair of geared rollers toward another geared roller of said first pair of geared rollers to accommodate for insulated wires of various dimensions, said first roller adjustment mechanism including a first pair of rotatable rods having an upper end and a lower end, bearings closely mounted to each of said rotatable rods, slidable plates mounted on said lower end of said first pair of rotatable rods, and an adjustment handle disposed on and freely rotating about said upper end of said rotatable rods, said first pair of rotatable rods being disposed in perpendicular relation to said first pair of geared rollers, said first pair of rotatable rods being disposed within said housing and further including a threaded portion for engaging a threaded opening defined by said frame for facilitating the vertical movement of said upper rollers, said bearings for providing fluid motion to said rotatable rods and maintaining proper alignment of said geared rollers, said slidable plates being slidably disposed within said housing for receiving said upper roller of said first pair of geared rollers to vertically adjust said upper roller upon rotation of said rotatable rods, said adjustment handle for manually rotating said rods and adjusting said upper roller on said first pair of geared rollers;

a cutting head for cutting said insulation along a line parallel to said length of said wire, said cutting head including a wire guide and two rotatable cutting blades disposed parallel to a direction of travel of said insulated wire, and a mounting plate, said wire guide including a funnel-shaped end for receiving said insulated wire from said first pair of geared rollers and a tubular end opposite said funnel end for receiving said two rotatable cutting blades and directing said insulated wire through said cutting blades and to said second pair of geared rollers, said cutting blades being disposed opposite each other and biased toward each other to adjust for different gauges of insulated wire, said mounting plate for removably mounting said cutting head to said cutting head bracket, said cutting head bracket being disposed between said first and said second pair of geared rollers for the optional use of a variety of said cutting guides having various of cutting blades;

a second pair of geared rollers carried within said frame and defining a second nip for pulling said insulated wire from said cutting head and stripping insulation from said wire, said cutting head being positioned between said first and said second pair of geared rollers, said second pair of geared rollers including an upper roller and a lower roller, said upper roller being movable in a vertical direction and rotatable about its axis, said lower roller being fixed other than for rotation about its axis, said second nip being adjusted by a second roller adjustment mechanism, said second roller adjustment mechanism including a biasing member for biasing one geared roller of said second pair of geared rollers toward another geared roller of said second pair of geared rollers to accommodate for insulated wires of various dimensions, said second roller adjustment mechanism including a second pair of rotatable rods, bearings closely mounted to each of said rotatable rods, slidable plates mounted on a lower end of said second pair of rotatable rods, and an adjustment handle disposed on and freely rotating about said upper end of said rotatable rods, said second pair of rotatable rods being disposed in perpendicular relation to said second pair of geared rollers, said second pair of rotatable rods being disposed within said housing and further including a threaded portion for engaging a threaded opening defined by said frame for facilitating the vertical movement of said upper rollers, said bearings for providing fluid motion to said rotatable rods and maintaining proper alignment of said geared rollers, said slidable plates being slidably disposed within said housing for receiving said upper roller of said second pair of geared rollers to vertically adjust said upper roller upon rotation of said rotatable rods, said adjustment handle for manually rotating said rods and adjusting said upper roller on said first pair of geared rollers; and a drive mechanism for coordinately interconnecting said geared rollers and driving said insulated wire through said geared rollers and said cutting head such that said insulated wire is maintained under a constant tension during the cutting and stripping process, said drive mechanism including a drive shaft in received in and extending from one of said first pair of geared rollers, a plurality of rotating shafts, one each extending from another of said first pair of geared rollers and each of said second pair of geared rollers, a drive chain for coordinately interconnecting each of said geared rollers, and a tensioning device for continuously adjusting the tension between said pairs of geared rollers, said drive shaft having a proximal end for receiving a sprocket wheel to engage said drive chain and a distal end for being slidably received within a mount of a ridge pipe threading machine to power said machine, each of said plurality of rotating shafts having a proximal end for receiving a sprocket wheel to engage said drive chain, said drive chain being disposed about each sprocket wheel to uniformly and coordinately rotate said first and said second pair of geared rollers, said tensioning device including a lever arm secured to said frame on one end, a sprocket wheel rotatably secured to said lever arm and a biasing means connectably extending between said lever arm and said frame to create tension in said drive chain.

* * * * *